United States Patent [19]
Cipolla et al.

[11] Patent Number: 5,758,197
[45] Date of Patent: May 26, 1998

[54] ONE-TIME-USE CAMERA WITH RESETTABLE FRAME COUNTER

[75] Inventors: David Cipolla, Pittsford; Mark A. Lamphron, Rochester, both of N.Y.

[73] Assignee: Eastman Kodak Company, Rochester, N.Y.

[21] Appl. No.: 819,978

[22] Filed: Mar. 13, 1997

[51] Int. Cl.[6] ........................................ G03B 17/02
[52] U.S. Cl. ........................................ 396/6; 396/284
[58] Field of Search ........................ 396/6, 284, 395, 396/396

[56] References Cited

U.S. PATENT DOCUMENTS

| | | |
|---|---|---|
| 2,530,510 | 11/1950 | Crumrine . |
| 2,700,223 | 1/1955 | Stinson ........................ 396/284 |
| 3,090,555 | 5/1963 | Hell . |
| 5,644,378 | 7/1997 | Boyd ........................ 396/284 |

*Primary Examiner*—David M. Gray
*Attorney, Agent, or Firm*—Roger A. Fields

[57] ABSTRACT

A camera comprising a film frame counter rotatable to successive numbered settings, and a counter actuator movable in engagement with the frame counter to rotate the frame counter to its next numbered setting, is characterized in that a bearing support for the frame counter supports the frame counter, first to permit the frame counter to be axially shifted to become separated from the counter actuator, and then to permit the frame counter to be rotated freely to reset the frame counter to an initial setting.

7 Claims, 3 Drawing Sheets

ONE-TIME-USE CAMERA WITH RESETTABLE FRAME COUNTER

FIELD OF THE INVENTION

The invention relates generally to the field of photography, and in particular to one-time-use cameras. More specifically, the invention relates to a one-time-use camera with a frame counter that is resettable to an initial setting when the one-time-use camera is recycled.

BACKGROUND OF THE INVENTION

By way of background, film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket that engages the filmstrip, a manually rotatable film advance thumbwheel rotatably engaged with a film spool inside the film cartridge, a single-blade shutter, a manually depressable shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and may have respective openings for the taking lens, the shutter release button, the film advance thumbwheel, the viewfinder, the frame counter wheel, and a flash emission window for the electronic flash. To use the one-time-use camera, after the photographer takes a picture, he manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket in engagement with the filmstrip, to rotate the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to a maximum frame number setting equal to the total number of exposures available on the unexposed filmstrip. Lastly, the outer box is placed on the camera unit.

When the one-time-use camera is originally manufactured or is recycled, care must be taken to rotationally set the frame counter to a zero setting before the unexposed filmstrip is prewound from the film cartridge onto the film take-up spool. If the frame counter is not at the zero setting, it will not be incremented to the maximum frame number setting when the unexposed filmstrip is prewound from the film cartridge onto the film take-up spool.

Prior art U.S. Pat. No. 3,090,555, issued May 21, 1963, discloses a reusable (rather than a one-time-use) camera in which a frame counter can be rotationally reset to a zero setting. The frame counter is rotatably mounted on a shaft only for rotation and cannot be shifted axially. A leaf spring has an integral counter advancing pawl that is reciprocated with the leaf spring to engage successive counter teeth, to rotate the frame counter to its next higher-numbered setting after each picture is taken. The leaf spring has a second integral pawl that remains in engagement with the counter teeth when the first pawl is momentarily disengaged from the counter teeth (during reciprocation of the leaf spring) to prevent any reverse rotation of the frame counter. A pair of additional springy curved projections on the leaf spring continuously press against a non-toothed smooth portion of the frame counter to provide a four-point support, with the two pawls, for the frame counter. The four-point support holds the frame counter against an inner side of the camera housing. To reset the frame counter to the zero setting, a raised knurled center portion of the frame counter, which protrudes from an opening in the camera housing, can be manually grasped to rotate the frame counter to the zero setting. Alternatively, a peripheral edge portion of the frame counter, which protrudes from a slot in the camera housing, can be manually grasped to similarly rotate the frame counter. However, the spring pressure of the two pawls and the two projections of the leaf spring against the frame counter appear to make it difficult to manually rotate the frame counter.

Instead of manually rotating the frame counter to the zero setting, a return spring, which is progressively tensioned each time the frame counter is rotated to its next higher-numbered setting, is used to automatically rotate the frame counter to the zero setting when the return spring is released. In this instance, a "suitable" device is provided for moving the two pawls away from the frame counter. However, the two projections continue to press against the frame counter. Thus, the return spring must be strong enough to quickly overcome the resistance of the two projections

SUMMARY OF THE INVENTION

One aspect of the invention is directed to a camera comprising a film frame counter rotatable to successive numbered settings, and a counter actuator movable in engagement with the frame counter to rotate the frame counter to its next numbered setting. The camera is improved in that:

the frame counter and the counter actuator are supported, first to permit one of them to be axially shifted relative to the other to become separated from each other, and then to permit the frame counter to be rotated freely to reset the frame counter to an initial setting. Preferably, a bearing support for the frame counter supports the frame counter, first to permit the frame counter to be axially shifted to become separated from the counter actuator, and then to permit the frame counter to be rotated freely to reset the frame counter to an initial setting.

Another aspect of the invention is directed to a method of recycling a one-time-use camera of the type including a film cartridge, a film take-up spool, a film frame counter rotatable to successive numbered settings, and a counter actuator movable in engagement with the frame counter to rotate the frame counter to its next numbered setting. The method comprises following the steps:

prewinding substantially an entire length of an unexposed filmstrip from a film cartridge onto a film take-up spool; and first axially shifting the frame counter to become separated from the counter actuator, and then rotating the frame counter to reset the frame counter to the initial setting.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

The One-Time-Use Camera

Figure 1:
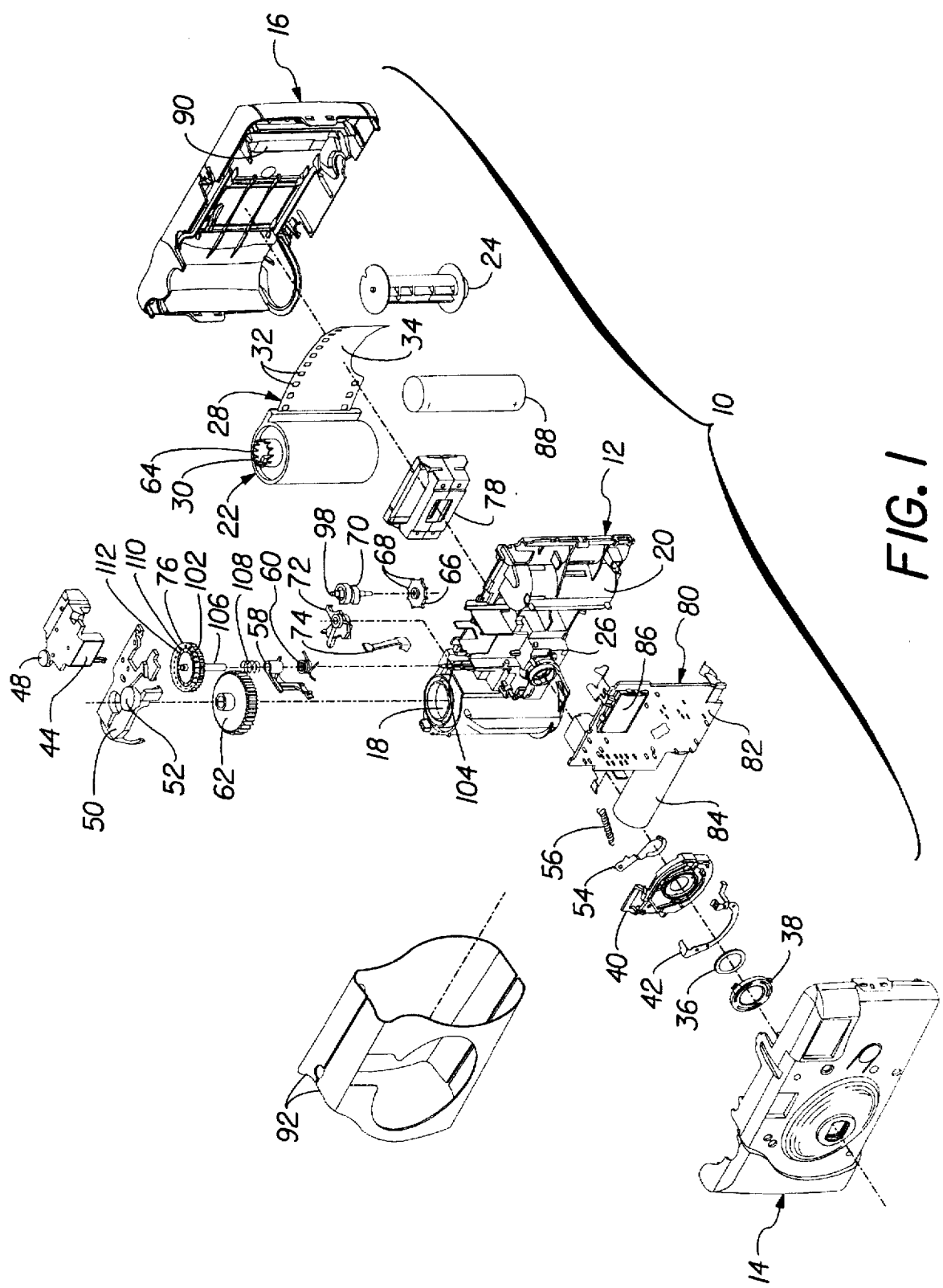
FIG. 1 is an exploded perspective view of a one-time-use camera, including a resettable frame counter, a main body part, a keeper plate and a viewfinder unit, according to a preferred embodiment of the invention.

Referring now to the drawings, FIG. 1 depicts a one-time-use or single-use camera 10 having a plastic main body part 12, and a pair of plastic front and rear cover parts 14 and 16 which connect to one another to house the main body part between them in order to complete the camera assembly. The main body part 12 is adapted to be nested in the front cover part 14, and the rear cover part 16 is intended to be fitted to the main body part 12 to make the main body part light-tight.

As shown in FIG. 1, the main body part 12 has integral cartridge-receiving and unexposed film roll chambers 18 and 20 for a light-tight film cartridge 22 and a film take-up spool 24. The chambers 18 and 20 are located at opposite sides of a backframe opening 26 at which successive frames of a 35 mm filmstrip 28 are exposed during picture-taking. The filmstrip 28 is originally provided in a roll form on a cartridge spool 30 rotatably supported inside the film cartridge 22, and it has a longitudinal series of edge perforations 32 included along a film leader 34 which protrudes from the film cartridge.

Figure 2:
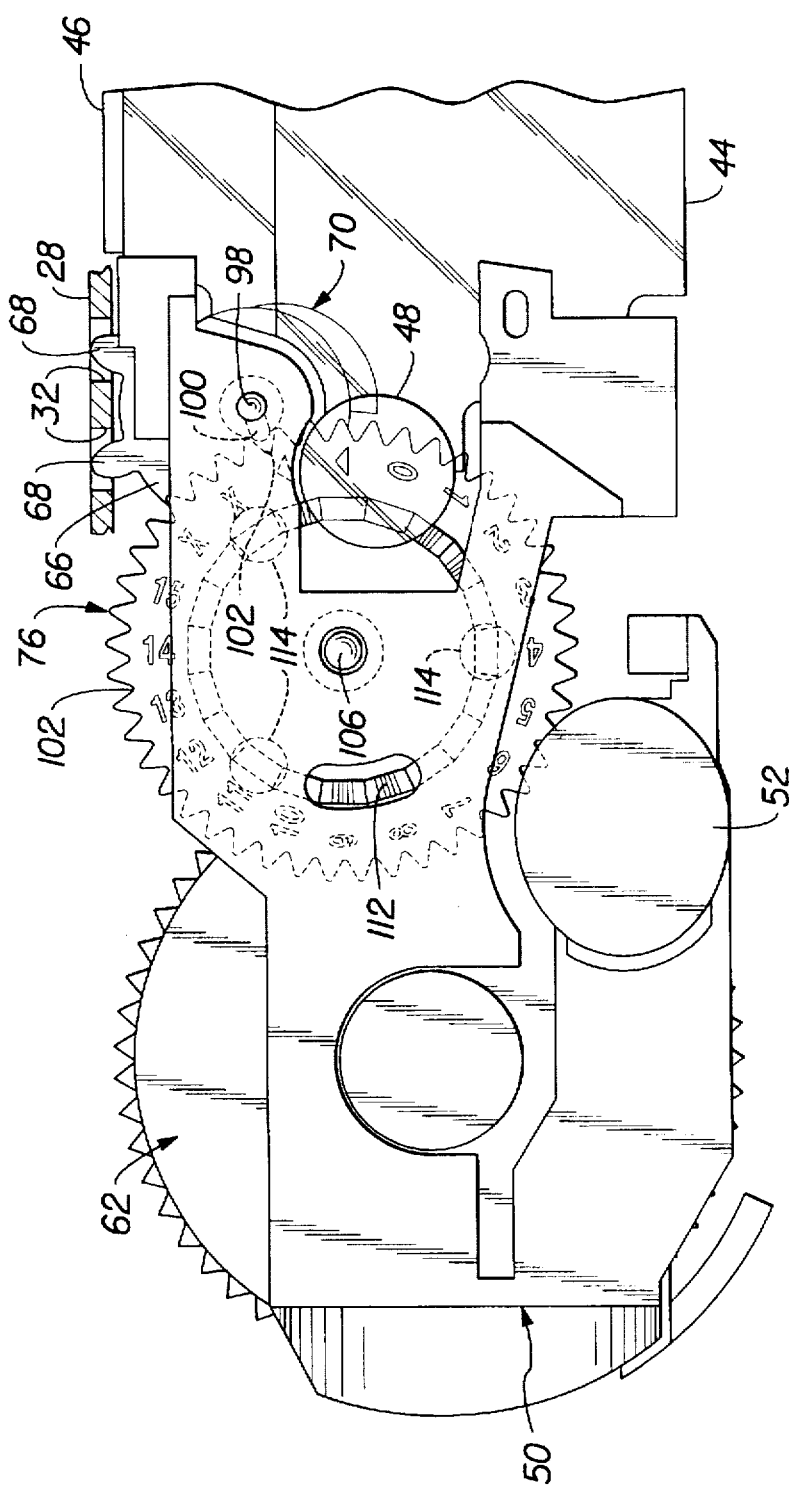
FIG. 2 is a top plan view of the frame counter, the main body part, the keeper plate and the viewfinder unit, assembled.
Figure 3:
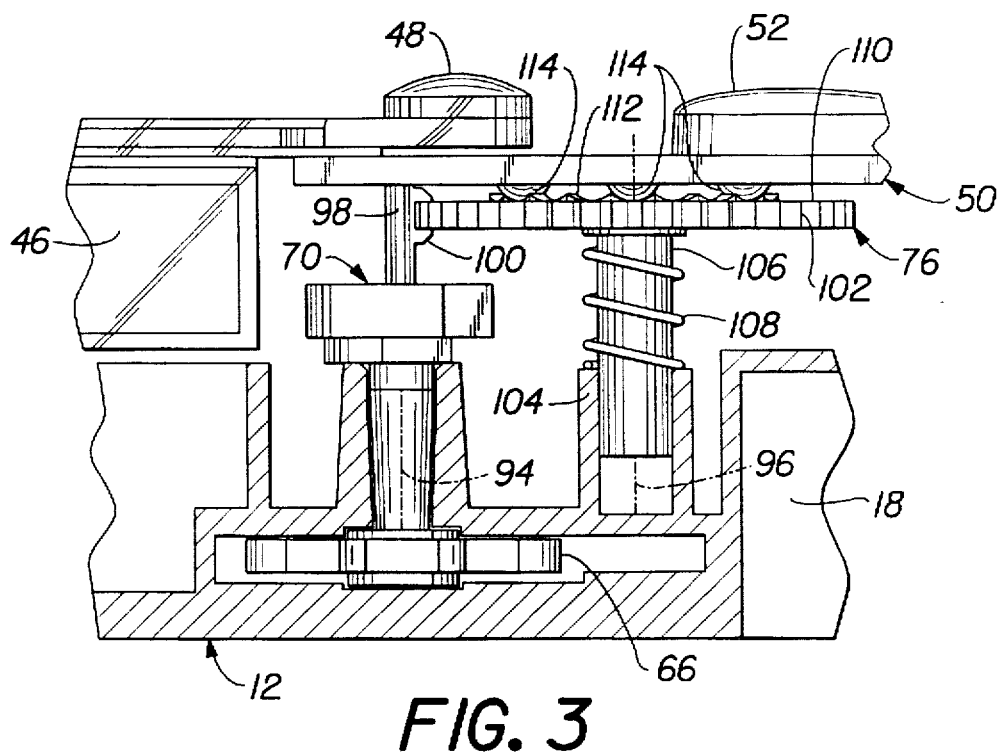
FIGS. 3 and 4 are rear elevation views of the frame counter, the main body part, the keeper plate and the viewfinder unit as shown in FIG. 2, depicting how the frame counter is reset.

As shown in FIGS. 1–3, the main body part 12 supports various camera elements which are connected to the main body part before it is nested in the front cover part 14 and the rear cover part 16 is fitted to the main body part to make the main body part light-tight. These camera elements are a fixed-focus taking lens 36 which is sandwiched between a snap-on lens retainer 38 and a lens support plate 40, connected as a unit to the main body part 12 at its front; a shutter-flash synchronization switch contact 42 attached to the lens support plate 40; an integral pair of front and rear viewfinder lenses 44 and 46 (only the front viewfinder lens is shown in FIG. 1) and an integral frame magnifier 48, connected as a unit to the main body part at its top; a shutter mechanism comprising a keeper plate 50 connected to the main body part 14 and having an integral manually depressable shutter release button 52 for releasing a pivotally mounted shutter blade 54, a shutter return spring 56, a high-energy lever 58 for actuating the shutter blade to pivot the blade open in order to uncover the taking lens to make a film exposure, and a lever actuating spring 60; a film advancing and metering mechanism comprising a manually rotatable thumbwheel 62 for engaging an exposed end 64 of the cartridge spool 30 to rotate the spool in order to wind an exposed frame of the filmstrip 28 into the film cartridge 22 after each film exposure and to move an unexposed frame from an unexposed film roll on the take-up spool 24 to the backframe opening 26 for the next exposure, a film metering sprocket 66 having an annular array of peripheral teeth 68 for successively engaging the respective perforations 32 in the filmstrip, and a cooperating metering cam 70, metering lever 72 and metering spring 74 which operate in a known manner in conjunction with a rotatable frame counter 76 (made readable via the frame magnifier 48), the thumbwheel 62, and the metering sprocket 66 to rotate the frame counter to its next lower-numbered setting and to lock the thumbwheel (until the shutter release button 52 is depressed) after the thumbwheel is rotated to wind an exposed frame into the film cartridge 22; a light baffle 78 which forms the backframe opening 26; and an electronic flash illumination assembly 80 comprising a circuit board 82, a capacitor 84, a flash emission lens 86, and a flash battery 88. The battery 88 is held in a battery-receiving chamber 90 in the main body part 12 A pair of front and rear decorative labels 92 cover central portions of the front and rear cover parts 14 and 16 after the front and rear cover parts are connected to one another to house the main body part 12 between them.

Figure 4:
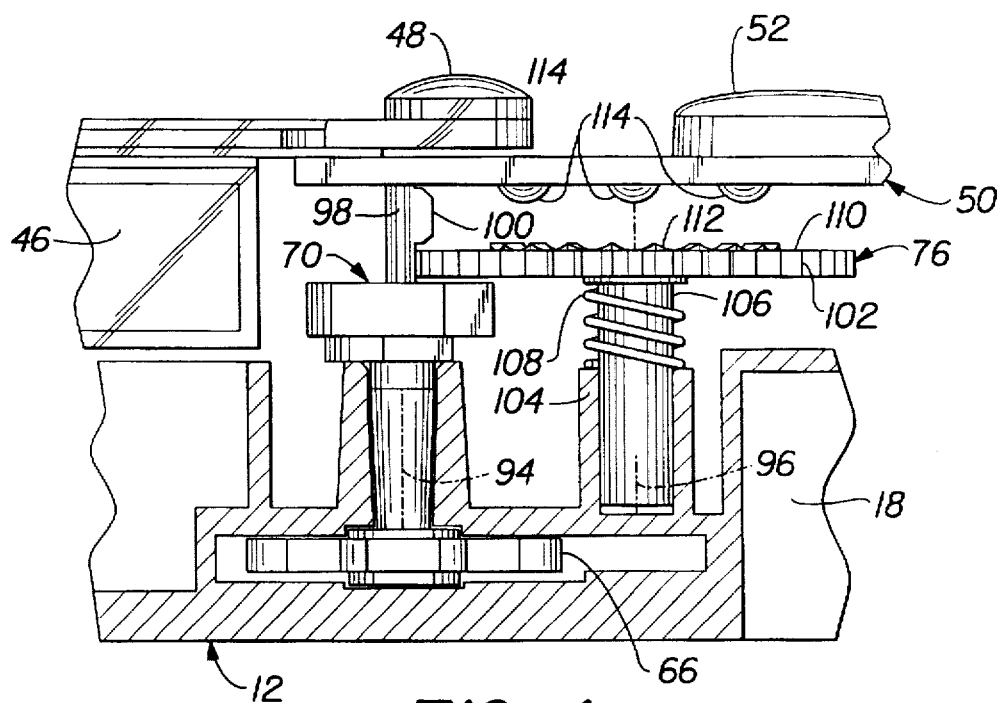

As shown in FIGS. 2–4, the metering sprocket 66 and the metering cam 70 are coaxially fixed to one another for concurrent rotation about an axis 94 when the thumbwheel 62 is manually rotated to rotate the cartridge spool 30 in order to wind an exposed frame of the filmstrip 28 into the film cartridge 22 after each film exposure. The main body part 12 and the keeper plate 50 rotationally support the metering sprocket 66 and the metering cam 70 to prevent them from being axially shifted. The axis 94 of the metering sprocket 66 and the metering cam 70 is parallel to an axis 96 of the frame counter 76.

The metering cam 70 has a central shaft 98, and an integral single tooth 100 that projects radially from the central shaft. See FIGS. 2 and 3. Each time the metering cam 70 is rotated, when the thumbwheel 62 is manually rotated to rotate the cartridge spool 30 in order to wind an exposed frame of the filmstrip 28 into the film cartridge 22 after each film exposure, the tooth 100 intermittently engages the frame counter 76 in one of its peripheral interdental spaces 102 to rotate the frame counter to its next lower-numbered setting.

A bearing support 104 of the main body part 12 rotationally supports the frame counter 76 at a counter shaft 106. See FIGS. 3 and 4. This first permits the frame counter 76 to be manually axially shifted in the bearing support 104 to become separated at one of its peripheral interdental spaces 102 from the tooth 100 of the metering cam 70, and then permits the frame counter to be manually freely rotated in the bearing support to reset the frame counter to an initial setting, when the one-time-use camera 10 is recycled. A helical compression return spring 108 is loosely coiled about the counter shaft 106 to lightly resist the frame counter 76 being axially shifted in the bearing support 104 to become separated from the tooth 100, but to avoid interfering with free rotation of the frame counter in the bearing support to reset the frame counter to the initial setting.

One side 110 of the frame counter 76 has a circular array of successive concavities 112. The keeper plate 50 is located over the one side 110, and has three evenly-spaced rigid semi-spherical projections 114 that fit into respective ones of the concavities 112 and separate from the respective concavities when the frame counter 76 is axially shifted in the bearing support 104 to become separated from the tooth 100 of the metering cam 70. The concavities 112 and the projections 114 serve to prevent any unintended rotation of the frame counter 76 when the metering cam 70 is rotated to momentarily swing the tooth 100 out of engagement with the frame counter 76 at one of its peripheral interdental spaces 102.

The Method

A preferred method of recycling the one-time-use camera 10 comprises following the steps:

(1) prewinding substantially an entire length of the unexposed filmstrip 28 from the film cartridge 22 onto the film take-up spool 22; and (2) first manually axially shifting the frame counter 76 in the bearing support 104 to become separated at one of the peripheral interdental spaces 102 from the tooth 100 of the metering cam 70, and then manually rotating the frame counter in the bearing support to reset the frame counter to the initial setting.

In this instance, the initial setting is "15", a maximum frame number setting equal to the total umber of exposures available on the filmstrip 28. Alternatively, of course, as in the prior art the initial setting can be "0".

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 front cover part
16 rear cover part
18 cartridge-receiving chamber
20 unexposed film roll chamber
22 film cartridge
24 film take-up spool
26 backframe opening
28 filmstrip
30 cartridge spool
32 edge perforations
34 film leader
36 taking lens
38 lens retainer
40 lens support plate
42 shutter-flash synchronization switch contact
44 front viewfinder lens
46 rear viewfinder lens
48 frame magnifier
50 keeper plate
52 shutter release button
54 shutter blade
56 shutter return spring
58 high-energy lever
60 lever actuating spring
62 thumbwheel
64 exposed end of spool 30
66 film metering sprocket
68 peripheral teeth
70 metering cam
72 metering lever
74 metering spring
76 frame counter
78 light baffle
80 electronic flash illumination assembly
82 circuit board
84 capacitor
86 flash emission lens
88 battery
90 battery-receiving chamber
92 front and rear labels
94 axis
96 axis
98 central shaft
100 tooth
102 interdental spaces
104 bearing support
106 counter shaft
108 return spring
110 counter side
112 concavities
114 projections

What is claimed is:

1. A camera comprising a film frame counter rotatable to successive numbered settings, and a counter actuator movable in engagement with said frame counter to rotate the frame counter to its next numbered setting, is characterized in that:

a support for said frame counter supports the frame counter, first to permit the frame counter to be axially shifted to become separated from said counter actuator, and then to permit the frame counter to be rotated freely to reset the frame counter to an initial setting;

one side of said frame counter has a circular array of successive concavities; and a plate located over said one side of the frame counter has a plurality of evenly-spaced rigid semi-spherical projections that fit into respective ones of said concavities and separate from the respective concavities when said frame counter is axially shifted to become separated from said counter actuator.

2. A camera as recited in claim 1, wherein a return spring urges said frame counter to resist the frame counter being axially shifted to become separated from said counter actuator, but is configured to avoid resisting rotation of the frame counter to allow the frame counter to be rotated freely when the frame counter is separated from the counter actuator.

3. A camera as recited in claim 1, wherein said frame counter has a peripheral array of interdental spaces, and said counter actuator is rotatable at intervals and has a tooth that is intermittently received in respective ones of said spaces to rotate said frame counter to its next-numbered setting when the counter actuator is rotated.

4. A camera as recited in claim 1, wherein said counter actuator is supported to prevent it from being axially shifted.

5. A method for a camera of the type including a film frame counter rotatable to successive numbered settings, and a counter actuator movable in engagement with the frame counter to rotate the frame counter to its next numbered setting, of resetting the frame counter to an initial setting comprising the following steps:

first axially shifting the frame counter to become separated from the counter actuator, including separating a circular array of successive conconcavities in the frame counter from a plurality of evenly-spaced rigid semi-spherical projections that fit into respective ones of the concavities, and then rotating the frame counter to reset the frame counter to the initial setting.

6. A method of recycling a one-time-use camera of the type including a film cartridge, a film take-up spool, a film frame counter rotatable to successive numbered settings, and a counter actuator movable in engagement with the frame counter to rotate the frame counter to its next numbered setting, said method comprising following the steps:

prewinding substantially an entire length of an unexposed filmstrip from a film cartridge onto a film take-up spool; and first axially shifting the frame counter to become separated from the counter actuator, including separating a circular array of successive concavities in the frame counter from a plurality of evenly-spaced rigid semi-spherical projections that fit into respective ones of the concavities, and then rotating the frame counter to reset the frame counter to the initial setting.

7. A method as recited in claim 6, wherein the initial setting is a maximum frame number setting equal to the total number of exposures available on the filmstrip.

* * * * *